May 11, 1937.  M. R. SHIPLEY  2,079,774
BALANCED PLUG VALVE
Original Filed Oct. 14, 1930
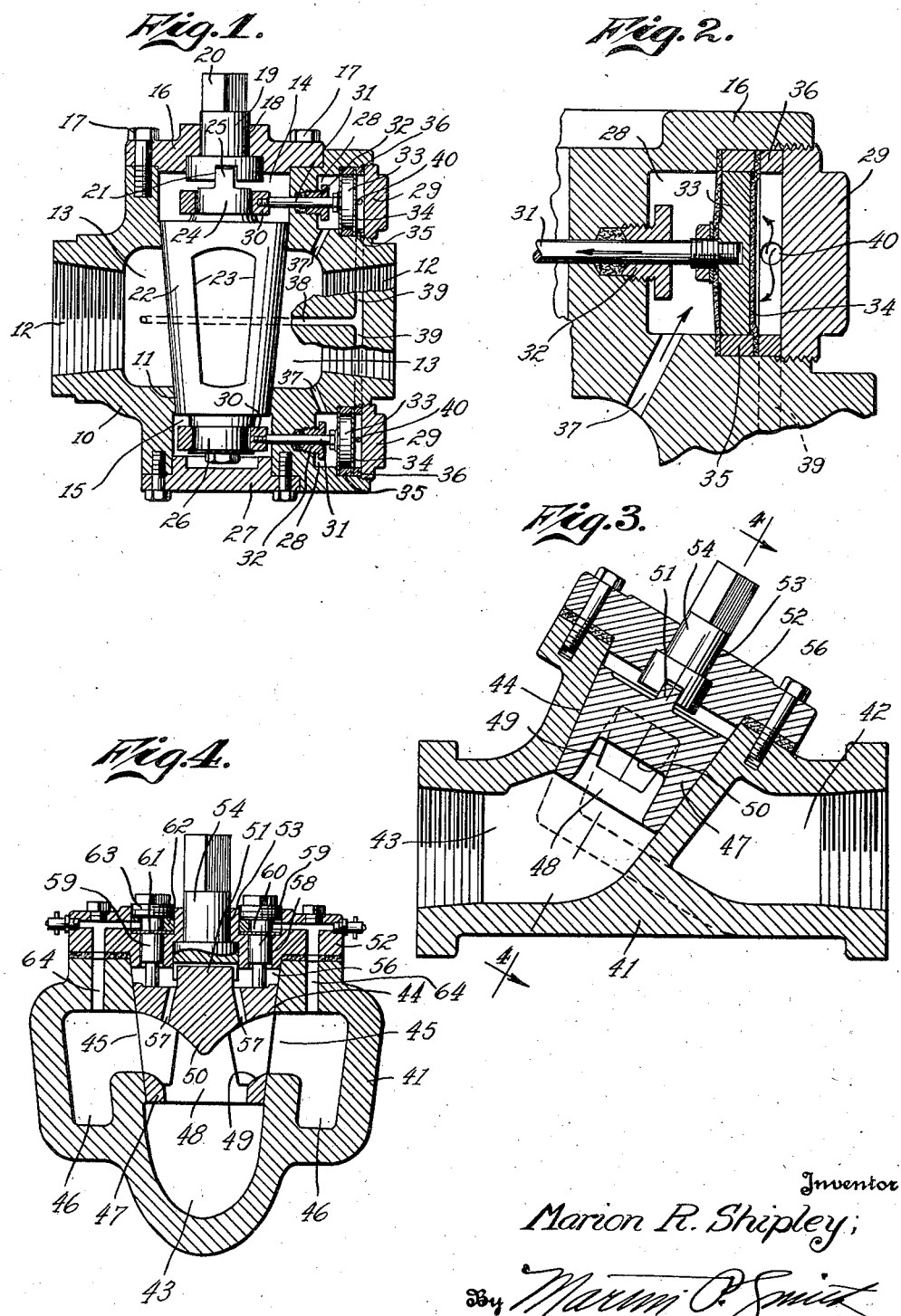
Inventor
Marion R. Shipley
By Marion P. Smith
Attorney Patented May 11, 1937

2,079,774

UNITED STATES PATENT OFFICE 2,079,774

BALANCED PLUG VALVE

Marion R. Shipley, Hermosa Beach, Calif., assignor to A. H. Shipley, Fresno, Calif.

Application October 14, 1930, Serial No. 488,608
Renewed October 7, 1936

32 Claims. (Cl. 251—98)

My invention relates to a balanced valve and has for its principal object the provision of relatively simple, inexpensive and efficient means whereby all side and end thrusts or pressure upon the movable fluid flow control member that is arranged for operation within the valve housing, are equalized and counterbalanced, thereby permitting the movable member to be operated while being opened or closed with comparatively little effort and also counteracting the excessive or comparatively rapid wear that is developed in valves utilized for controlling the flow of high pressure fluids.

The particular type of valve embodying my invention and herein set forth employs a rotary plug for controlling the fluid flow through the valve housing, but it will be understood that my invention contemplates the counterbalancing of the fluid flow control members in practically all types of valves, plugs, cocks and the like and which employ rotary plugs, movable discs or plates or like mechanical devices for opening and closing the ports or passages through the valve housings.

Valves embodying my invention are particularly adaptable for use in high pressure lines, for instance, in the mud or circulation line of an oil well drilling rig for boiler blow-off valves and for lines carrying steam, compressed air or other fluid under pressure.

With the foregoing and other objects in view, my invention consists in certain novel features of construction and arrangement of parts that will hereinafter be more fully described and claimed and illustrated in the accompanying drawing, in which:

Fig. 1 is a vertical section taken through the center of a balanced plug valve embodying the principles of my invention.

Fig. 2 is an enlarged detail section through the upper portion of the valve housing and showing a piston arranged for operation within a piston chamber in said housing.

Fig. 3 is a vertical section taken lengthwise through the center of a modified form of the valve and with the axis of the plug inclined with respect to the axis of the main body of the valve housing.

Fig. 4 is a cross section taken on the line 4—4 of Fig. 3.

Referring by numerals to the accompanying drawing which illustrates a practical embodiment of my invention, 10 designates the body or housing of the valve which is provided with a vertically disposed tapered chamber 11 that is adapted to receive the tapered plug of the valve and formed through the wall of the housing at diametrically opposite points are threaded openings 12 for the reception of tubular members forming a part of the line or duct in which the valve is located. The inner ends of the opening 12 communicate with the tapered valve chamber 10 through oppositely disposed chambers 13.

Formed in the upper portion of the valve housing 10 directly above the tapered valve chamber 11 is a shallow chamber 14 and formed in the lower portion of the housing directly below the lower end of the tapered chamber 11 is a shallow chamber 15.

Applied to the upper end of the housing 10 and closing the chamber 14 is a bonnet or cap plate 16 that is detachably secured to the valve body in any suitable manner, preferably by means of cap screws 17. Formed in the center of this bonnet is an opening 18 that serves as a bearing for a valve actuating stem 19, the latter provided on its outer end with a non-circular lug 20 adapted to receive an operating lever or wrench. The inner end of this stem that projects into the chamber 14 is provided with a transverse groove 21.

Arranged for rotation in the tapered chamber 11 is a tapered plug 22, through which is formed a diametrically arranged port 23 that is adapted to register with the inner ends of the chambers 13 so as to establish communication between the openings 12 and formed integral with and projecting upwardly from the top of this plug is an axially disposed circular lug 24.

Projecting upwardly from the top of this lug is a diametrically disposed rib 25 which, when the parts of the valve are properly assembled, occupies the groove or recess 21 in the underface of stem 19.

Formed integral with and projecting downwardly from the lower end of the tapered plug 22 is an axially disposed cylindrical lug 26 that extends into chamber 15 and secured on the lower end of the housing 10 and forming a closure for chamber 15, is a plate 27.

Formed in one side of housing 10, directly above and below one of the openings 12, are short horizontally disposed cylindrical chambers 28, the outer ends of which are closed by screw plugs 29.

Encircling lugs 24 and 26 are rings 30, to which are connected the inner ends of piston rods 31, the same projecting through stuffing boxes 32 into the chambers 28 and secured on the outer ends of these piston rods within said chambers are pistons 33.

Arranged directly against the faces of each piston 33 are diaphragms 34, of rubber, leather or suitable flexible composition and the edges of these diaphragms extend beyond the edge of the piston and are engaged by a retaining ring 35 that is positioned in the outer portion of the piston chamber.

Interposed between the outer one of the diaphragms 34 and the screw plug 29 is a ring 36. When plug 29 is tightened the rings 35 and 36 grip the edges of the diaphragms 34 and thus the latter are very securely retained on both sides of the piston 33 and said diaphragms effectually prevent leakage of fluid pressure past the piston.

While I prefer to form the diaphragms 34 from flexible material, such as rubber, leather or composition, they may in some instances be formed of thin flexible metal such as copper.

Leading from the adjacent one of the chambers 13 into the inner portions of the piston chambers 28 are ducts or ports 37.

Leading from the opposite one of the chambers 13 through the wall of valve housing 10 is a duct 38 which divides at a point between the outer ends of the piston chambers 28 and the branches 39 of this duct lead through the valve housing and through ports 40 that are formed in ring 36 into the piston chambers between the pistons 33 and the screw plugs 29 (see Fig. 2).

While in service, the chambers 14 and 15 above and below the valve plug 22 are filled with grease or plastic lubricant and likewise chambers 28 and the chambers between the plugs 29 and the outer one of the diaphragms 34 are filled with grease or plastic lubricant.

In the construction illustrated in Figs. 3 and 4, a valve housing 41 is provided with oppositely arranged inlet and outlet ports 42 and 43 and that portion of the housing between said ports is inclined relative to the axis of the body 41.

In Fig. 3 I have shown the intermediate portion of the body disposed at an angle of approximately 60° relative to the axis of body 41, but it will be understood that this degree of angularity may be varied as desired.

Formed within the inclined intermediate portion of the body is a tapered valve chamber 44 and leading from the intermediate portion thereof are laterally disposed ports 45 that communicate with the inlet port 42 through branch ducts 46 that lead from said inlet port 42, through the sides of the inclined intermediate portion of the valve housing.

The lower end of the tapered chamber 44 communicates directly with the inner end of outlet port 43.

Arranged for rotation within the tapered chamber 44 is a tapered valve plug 47 within the lower portion of which is a chamber 48 and leading upwardly and outwardly therefrom are diametrically arranged curved ducts or ports 49 that are adapted to communicate with ports 45, to provide continuous passage for the flow of fluid through the valve and its housing. The metal in the body of the plug 47 is extended downwardly between the ports 48 so as to form a substantially V-shaped rib 50 that occupies a transverse position between the inner ends of the ports 49.

Formed on top of the valve plug 47 is a transversely disposed rib 51.

Detachably secured on top of the inclined intermediate portion of the valve housing is a cap or plate 52 and formed through the center thereof is a bearing 53 for a short shaft or stem 54 and formed on the inner end of this shaft or stem is a transversely disposed groove 55 which receives the rib 51.

The outer end of the shaft or stem 54 is made square or hexagonal for the reception of a wrench or operating lever.

The upper end of valve plug 47 is spaced a short distance away from the cap or plate 52, thereby providing a chamber 56 that is filled with grease or plastic lubricant and leading from the upper portions of the ducts 49 upwardly through the upper portion of the valve plug and communicating with this chamber 56 are small ducts 57.

Formed through the cap 52 to the sides of the bearing 53 are bearings 58 for plungers 59 and the lower ends of these plungers bear directly on top of plug 47.

The upper ends of the bearings 58 communicate with chambers 60 that are formed in plate 52 and arranged in the lower portions of these chambers and bearing on the tops of the plungers 59 are diaphragms 61 of flexible material such as leather, rubber or thin sheet metal such as copper. These diaphragms are retained in position within the lower portions of the chambers 60 by rings 62 that bear on the edges of said diaphragms and said rings being held in position by screw plugs 63 that are seated in the outer ends of the chambers 60.

Leading from the upper portions of the chambers 46 upwardly through the valve housing and through the sides of plate 52 are ducts 64, the upper portions of which extend inwardly through the plate and through the retaining rings 62 and the inner ends of these ducts communicate with the chambers 60 above the diaphragms 61.

When the form of valve illustrated in Figs. 1 and 2 is closed so as to cut off the passage of fluid pressure through said valve, fluid pressure from the line in which the valve is located will pass through ducts 37 into the inner portions of chambers 28, thereby exerting pressure upon the inner members of the diaphragms 34 so as to move the pistons 33 outwardly and this outward movement of the pistons is not opposed by fluid pressure against the outer ones of the diaphragms for the reason that no fluid pressure is entering the outer portions of the chambers 28 through ducts 38 and 39.

In this connection it will be understood that the port 12 that is disposed between the pistons 33 is the port that is connected to the fluid pressure supply line.

The pressure against the inner faces of the pistons and the diaphragms overlying same will tend to move said pistons outwardly in their chambers, thereby imparting corresponding movements to the piston rods 31 and to the rings 30 encircling the stems or trunnions 24 and 26 on the ends of the valve plug and thus the fluid pressure against the side of the valve plug that is positioned adjacent to the inlet port 12, to which the fluid pressure line is connected, will be counteracted.

When the valve is closed and the line pressure is impressed on the side of the valve plug adjacent to the end of the line that is connected to the valve housing, the side thrust or pressure upon the body of the valve, through the pistons, piston rods and rings is transferred to the trunnions on the ends of the valve body, but owing to the line pressure upon the pistons this transferred pressure will be equalized so as to minimize the frictional engagement between the ends of the valve plug and the valve housing adjacent to the chambers 14 and 15 and as a result the plug may be very readily rotated even though the valve be located in a line that is carrying extremely high pressures.

Pressure of the fluid entering the valve housing will slip by the joint between the ends of the plug and the bearings therefor and such pressure will enter the chambers 14 and 15, thereby counterbalancing and equalizing the end thrust upon the valve plug.

In some instances and particularly in the larger forms of valves it may be found desirable to equip the rings 30 that engage the trunnions on the ends of the valve plug with suitable anti-friction bearings that employ either rollers or balls, thereby tending to minimize friction of the operating parts.

When the form of valve illustrated in Figs. 1 and 2 is opened, the port 23 is in communcation with the chambers 13, thereby permitting the fluid to pass through the valve and under such conditions the pressure of both pistons 33 and the diaphragms arranged adjacent to the faces of said pistons is equalized by fluid pressure entering the inner ends of the chambers 28 through ports 37 and by pressure that passes through duct 38 and its branches 39 into the chambers in front of the pistons.

Thus it will be seen that the rotary plug of my improved valve is under all conditions hydraulically balanced, thereby enabling said plug to be readily rotated when opened or closed and as a result of this equalization of pressure on the plug the latter will not chatter as a result of the unequal pressure or as a result of the pressure developed by the flow of fluid through the valve housing.

In the modified construction illustrated in Figs. 3 and 4, the tendency of the fluid pressure to lift the valve from its seat while closed or open is counterbalanced by the plungers 59 which are subjected to fluid pressure that enters the chambers 60 above the diaphragms 61 through ducts 64.

The valve plug 47 in this structure is further counterbalanced by fluid pressure that enters the grease filled chamber 56 above the valve plug through ducts 57.

Thus it will be seen that I have provided an improved construction whereby the pressure from a fluid pressure supply line and which is impressed on a rotary valve plug is equalized and balanced so as to permit the plug to be readily rotated when opened or closed and my improved counterbalancing and equalizing arrangement may be advantageously employed in practically all forms of plug valves and cocks and particularly valves that are utilized in lines that convey extremely high pressures, for instance, in the circulation lines of deep well drilling rigs and in boiler blow-off connections.

The equalization and consequent balancing of the pressure upon the valve is accomplished automatically and the construction of the valve is such that it may be very easily and cheaply produced.

It will be understood that minor changes in the size, form and construction of the various parts of my improved balanced plug valve may be made and substituted for those herein shown and described without departing from the spirit of my invention, the scope of which is set forth in the appended claims.

I claim as my invention:

1. In a balanced plug valve, a housing provided with a valve chamber, said chamber having inlet and outlet openings, a plug arranged for rotation in said valve housing for controlling the flow of fluid through the chamber within said housing, pistons arranged for operation in chambers in said valve housing and connections from said pistons to both ends of the valve plug whereby side thrust upon the plug resulting from fluid pressure entering the valve housing is counteracted.

2. A balanced plug valve, as set forth in claim 1, and with means for admitting pressure fluid from the valve chamber within the housing to both ends of the piston chambers.

3. In a balanced plug valve, a housing provided with oppositely arranged ports and with a chamber between and communicating with said ports both ends of which are closed, a plug arranged for rotation within the housing and extending through the chamber therein, said plug having a port that is adapted to communicate with the ends of the chamber in the valve housing and fluid pressure actuated means connected to both ends of said tapered plug for counteracting side thrust that would otherwise be impressed on said plug as a result of the pressure of the fluid admitted to the valve chamber.

4. In a balanced plug valve, a housing provided with inlet and outlet ports and an intermediate valve chamber both ends of which chamber are closed, a plug arranged for rotation within said chamber for controlling the flow of fluid through said chamber, fluid pressure actuated means connected to both ends of said valve plug for counteracting side thrust that would otherwise be developed by the pressure of the fluid against the side of the valve plug and means connected to one end of said valve plug for rotating the same.

5. In a balanced plug valve, a valve housing provided with inlet and outlet ports and an intermediate valve chamber, a plug arranged for rotation in said valve chamber for controlling the flow of fluid therethrough, trunnions on the ends of said tapered plug, pistons connected to said trunnions which pistons are arranged for operation in piston chambers and means for admitting fluid pressure to both ends of the piston chambers.

6. In a balanced plug valve, a valve housing provided with inlet and outlet ports and an intermediate valve chamber, a tapered plug arranged for rotation in said valve chamber for controlling the flow of fluid therethrough, trunnions on the ends of said tapered plug, pistons connected to said trunnions which pistons are arranged for operation in piston chambers, means for admitting fluid pressure to both ends of the piston chambers and means connected to one of said trunnions for rotating said tapered plug.

7. In a balanced plug valve, a housing provided with inlet and outlet ports and an intermediate valve chamber, a tapered plug arranged for rotation within the housing for controlling the flow of fluid through the chamber therein and means connected to the ends of said valve and disposed at right angles to the axis thereof for counteracting the pressure of the fluid that enters the valve chamber against the exposed surface of the tapered plug.

8. In a balanced plug valve, a housing provided with inlet and outlet ports and an intermediate valve chamber, a tapered plug arranged for rotation within the housing for controlling the flow of fluid through the chamber therein and means arranged at right angles to the axis of said tapered plug and connected to the ends thereof and actuated by the pressure of fluid admitted to the valve chamber for counteracting the pressure of the admitted fluid against the exposed surface of said tapered plug.

9. In a balanced plug valve, a housing provided with inlet and outlet ports and an intermediate chamber, a tapered plug arranged for operation within said chamber for controlling the flow of fluid therethrough, means connected to the ends of said tapered plug and arranged at right angles to the axis thereof for counteracting the pressure of the fluid against the exposed face of the tapered plug, which means includes pistons arranged for operation in piston chambers and means for admitting fluid pressure from points within the valve chamber on opposite sides of the tapered plug to the ends of the piston chambers.

10. The combination with a valve housing having inlet and outlet ports of a plug arranged for rotation within said valve housing for controlling the flow of fluid therethrough, trunnions on the ends of said plug and means connected to said trunnions and acted upon by the pressure of fluid entering and passing through the valve housing for counteropposing the forces acting upon the sides of said plug.

11. The combination with a valve housing having inlet and outlet ports of a plug arranged for rotation within said housing for controlling the flow of fluid therethrough, trunnions on the ends of said plug and means connected to said trunnions and including pistons that are acted upon by the pressure of the fluid that enters and passes through the valve housing, for counteropposing the forces acting upon the sides of said plug.

12. A balanced plug valve as set forth in claim 11, with flexible diaphragms arranged adjacent to the ends of said pistons and means whereby pressure fluid from within the valve housing is admitted to the chambers in which said pistons and diaphragms are located and which admitted pressure fluid coacts with said pistons and diaphragms to counteroppose the forces that produce side thrust upon said plug.

13. In a balanced plug valve, a housing provided with a valve chamber having inlet and outlet openings, a plug arranged for rotation within the valve housing for controlling the flow of fluid through the chamber within said housing, pistons arranged for operation in chambers within said valve housing, connections from said pistons to the ends of the valve plug and means for admitting pressure fluid from the valve chamber to the chambers in which said pistons are located and which pistons and the pressure fluid admitted to the piston chambers coact to counteroppose forces acting against the valve plug.

14. A balanced plug valve as set forth in claim 13, with flexible diaphragms arranged adjacent to the ends of said pistons and means for admitting pressure fluid from within the valve housing to the chambers in which said pistons and diaphragms are located, which admitted pressure fluid coacts with the pistons and diaphragms to counteroppose the forces acting against said valve plug.

15. In a balanced plug valve, a housing provided with inlet and outlet openings, a plug arranged for rotation within said housing for controlling the flow of fluid therethrough, means actuated by the pressure of the fluid thus controlled and connections from said last mentioned means to said plug for counteropposing the forces creating side thrust against said plug.

16. In a balanced plug valve, a housing provided with inlet and outlet openings, a plug arranged for rotation within said housing for controlling the flow of fluid therethrough and pistons actuated by the pressure of the fluid thus controlled for holding said plug on its seat.

17. In a balanced valve, a housing provided with inlet and outlet openings, a member arranged for operation within said housing for controlling the flow of fluid therethrough while in frictional contact with the wall of said housing and pistons arranged for operation within piston chambers and actuated by the pressure of the fluid thus controlled for counteropposing the forces acting against said fluid flow control member.

18. A balanced valve as set forth in claim 17, with connections from said pistons to said flow control member and means whereby the fluid is applied to the ends of said pistons.

19. A balanced valve as set forth in claim 17, with connections from said pistons to said fluid flow control member and means including flexible diaphragms arranged adjacent to the ends of said pistons, which admitted fluid pressure coacts with the pistons and diaphragms to counteroppose the forces that produce side thrust upon said fluid flow control member.

20. In a balanced valve, a housing provided with inlet and outlet openings, a member arranged for operation within said housing for controlling the flow of fluid therethrough and nonexpansive reciprocating means actuated by the pressure of the controlled fluid for counteropposing the forces acting against said fluid flow control member.

21. In a balanced valve, a housing provided with inlet and outlet openings, a member arranged for operation within said housing for controlling the flow of fluid therethrough and means disposed and arranged parallel with the line of flow of fluid through said housing from the inlet to the outlet openings and actuated by the pressure of the fluid that enters said housing for counteropposing the forces acting against said fluid flow control member.

22. In a balanced valve, a housing provided with inlet and outlet openings, a member arranged for operation within said housing for controlling the flow of fluid therethrough and means disposed at right angles to the axis of said fluid flow controlling member and actuated by the pressure of the fluid thus controlled for opposing the forces creating side thrust against said fluid flow control member.

23. In a balanced valve, a housing provided with inlet and outlet openings, a member arranged for operation within said housing for controlling the flow of fluid therethrough, flexible diaphragms actuated by the pressure of the fluid thus controlled, pistons disposed by the said diaphragms and connected to said fluid flow control member, the fluid pressure, said diaphragms and pistons coacting to counteroppose the forces acting against said fluid flow control member.

24. In a balanced valve, a housing provided with inlet and outlet openings, a member arranged for operation within said housing for controlling the flow of fluid therethrough, flexible plate-like diaphragms actuated by the pressure of the fluid thus controlled, means for transmitting the forces acting against said diaphragms to said fluid flow control member and said fluid pressure, said diaphragms and force transmitting means coacting to counteroppose the forces acting against said fluid flow control member.

25. In a balanced valve, a housing provided with inlet and outlet openings, a member arranged to operate in frictional contact with said housing while being operated to control the flow of fluid pressure therethrough, means actuated by the pressure of the fluid thus controlled including connections from said means to said flow control member to oppose the forces acting against said flow control member, thereby reducing the frictional contact between said flow control member and said housing.

26. In a balanced plug valve, a housing provided with inlet and outlet openings, a plug arranged for rotation within said housing for controlling the flow of fluid therethrough, mechanically operated means actuated by the pressure of the fluid thus controlled to counteroppose the forces creating side thrust against said plug.

27. In a balanced valve, a housing provided with inlet and outlet openings, a member arranged to operate in frictional contact with said housing while being operated to control the flow of fluid therethrough, mechanically operated means actuated by the pressure of the fluid thus controlled to counteroppose the forces creating side thrust against said flow control member, thereby reducing the frictional contact between said flow control member and said housing.

28. In a balanced plug valve, a housing provided with inlet and outlet openings, a plug arranged for operation within said housing for controlling the flow of fluid therethrough, trunnions on the ends of said plug and means connected to said trunnions, and actuated by the pressure of the controlled fluid for counteropposing the forces creating side thrust against said plug.

29. In a balanced plug valve, a housing provided with inlet and outlet openings, a plug arranged for operation within said housing for controlling the flow of fluid therethrough, trunnions on the ends of said plug and means connected to said trunnions for counteropposing the forces creating side thrust against said plug.

30. In a balanced valve, a housing provided with inlet and outlet openings, a member arranged for operation within said housing for controlling the flow of fluid therethrough and mechanically operated means connected to said flow control member for counteropposing the forces creating side thrust against said fluid flow control member.

31. In a balanced plug valve, a housing provided with inlet and outlet openings, a plug arranged for operation within said housing for controlling the flow of fluid therethrough, mechanically operated means connected to said plug for counteropposing the forces creating side thrust against said plug.

32. In a balanced plug valve, a housing provided with inlet and outlet openings, a plug arranged for rotation within said housing for controlling the flow of fluid therethrough, pistons actuated by the pressure of the controlled fluid for counteropposing the forces acting against said plug.

MARION R. SHIPLEY.